United States Patent [19]
Watts et al.

[11] Patent Number: 5,897,375
[45] Date of Patent: Apr. 27, 1999

[54] CHEMICAL MECHANICAL POLISHING (CMP) SLURRY FOR COPPER AND METHOD OF USE IN INTEGRATED CIRCUIT MANUFACTURE

[75] Inventors: David Watts, Austin, Tex.; Rajeev Bajaj, San Jose, Calif.; Sanjit Das; Janos Farkas, both of Austin, Tex.; Chelsea Dang, Plugerville, Tex.; Melissa Freeman; Jaime A. Saravia, both of Round Rock, Tex.; Jason Gomez; Lance B. Cook, both of Austin, Tex.

[73] Assignee: Motorola, Inc., Schaumburg, Ill.

[21] Appl. No.: 08/954,190

[22] Filed: Oct. 20, 1997

[51] Int. Cl.$^6$ .................................................. B24B 1/00
[52] U.S. Cl. ..................... 438/693; 438/691; 438/692; 106/3; 106/11; 51/304; 51/306; 51/309
[58] Field of Search ........................... 106/3, 11; 51/304, 51/306, 309; 438/691–693

[56] References Cited

U.S. PATENT DOCUMENTS

| | | | |
|---|---|---|---|
| 4,954,142 | 9/1990 | Carr et al. | 51/309 |
| 4,959,113 | 9/1990 | Roberts | 156/636 |
| 5,084,071 | 1/1992 | Nenadic et al. | 51/309 |
| 5,139,571 | 8/1992 | Deal et al. | 106/3 |
| 5,225,034 | 7/1993 | Yu et al. | 156/636 |
| 5,391,258 | 2/1995 | Brancaleoni et al. | 156/636 |
| 5,527,423 | 6/1996 | Neville et al. | 156/636.1 |
| 5,614,444 | 3/1997 | Farkas et al. | 437/225 |

OTHER PUBLICATIONS

Ronald Carpio et al., "Initial study on copper CMP slurry chemistries", 1995 Elsevier Science S.A., Thin Solid Films 266 (1995), pp. 238–244.

S.P. Murarka et al., "Advanced Metallization for Devices and Circuits—Science, Technology and Manufacturability", Mat. Res. Soc. Symposium Proceedings, vol. 337, 1994, pp. 133–138.

J.M.Steigerwald et al., "Mat. Res. Soc. Symp. Proc.," vol. 337, 1994, Method of Chemical Mechanical Polishing Predominantly Copper Containing Metal Layers in Semiconductor Processing, pp. 133–138.

Primary Examiner—Deborah Jones
Attorney, Agent, or Firm—Keith E. Witek

[57] ABSTRACT

A method for chemical mechanical polishing (CMP) a copper layer (22) begins by forming the copper layer (22). The copper layer (22) is then exposed to a slurry (24). The slurry (24) contains an oxidizing agent such as $H_2O_2$, a carboxylate salt such as ammonium citrate, an abrasive slurry such as alumna abrasive, an optional triazole or triazole derivative, and a remaining balance of a solvent such as deionized water. The use of the slurry (24) polishes the copper layer (22) with a high rate of removal whereby pitting and corrosion of the copper layer (22) is reduced and good copper interconnect planarity is achieved. This slurry (24) has good selectivity of copper to oxide, and results in copper devices which have good electrical performance. In addition, disposal of the slurry (24) is not environmentally difficult since the slurry (24) is environmentally sound when compared to other prior art slurries.

32 Claims, 3 Drawing Sheets

CHEMICAL MECHANICAL POLISHING (CMP) SLURRY FOR COPPER AND METHOD OF USE IN INTEGRATED CIRCUIT MANUFACTURE

CROSS REFERENCE TO RELATED APPLICATION

The case is related to a co-pending U.S. application by Farkas et al., Ser. No. 08/684,782, filed Jul. 22, 1996, and assigned to the assignee hereof.

FIELD OF THE INVENTION

The present invention relates generally to semiconductor manufacturing, and more particularly to, a slurry composition containing hydrogen peroxide, citric acid, ammonium citrate, and alumina abrasive which is used to polish copper interconnects on integrated circuits (ICs).

BACKGROUND OF THE INVENTION

The integrated circuitry (IC) industry is currently researching and developing new metallic interconnect materials and structures which can be used within integrated circuits (ICs). A promising metallic material which will be used in the future for integrated circuit (IC) interconnects is copper (Cu). Copper is desired in the integrated circuit industry since copper has improved electromigration resistance over aluminum and other metallic materials which are currently being used in the integrated circuit industry. In addition, copper has a lower resistivity than other commonly used metallic materials, whereby the performance of integrated circuit devices can be greatly improved through the use of copper interconnects.

However, there is currently no known technology which can effectively plasma etch or wet etch copper materials so that functional copper interconnects are adequately formed over the surface of an integrated circuit. In order to overcome this limitation, copper chemical mechanical polishing (CMP) has been suggested as the most promising alternative which can render proper formation of copper interconnects on an integrated circuit. Therefore, the industry is currently searching for an optimal chemical mechanical polishing (CMP) slurry which can be used to form copper interconnects on an integrated circuit (IC).

It is known in the industry to use one of either $H_2O_2$ or $H_3PO_4$ as an oxidizing agent in a slurry in order to perform aluminum polishing. It is also known in the art to use one of $H_2O_2$, $KIO_3$, $Ce(NO_3)_4$, $Fe(NO_3)_3$, and $K_3Fe(CN)_6$ to polish tungsten material. It is also known to use one of $HNO_3$, $HN_4OH$, or $KMnO_4$ to perform polishing of copper. Therefore, these chemical compounds have been extensively researched by CMP engineers in an attempt to discover an optimal copper CMP process. However, the use of these known chemicals has not yet produced optimal copper polishing results.

For example, various experimentation performed using the known chemistries described above have resulted in one or more of: (1) poor removal rate whereby CMP throughput is inadequate; (2) excessive pitting and/or corrosion of the copper material whereby device performance and device yield is reduced; (3) layer planarity problems; (4) poor IC electrical performance; or (5) poor selectivity to copper over adjacent oxide materials ("oxide" refers to "silicon dioxide" and the two may be used interchangeably herein.)

Therefore, a need exist in the industry for an improved CMP slurry which may be used to manufacture copper interconnects while reducing or eliminating one or more of the above common copper CMP problems. This improved slurry should have good removal rate whereby CMP throughput is improved, reduced or eliminated pitting and corrosion of the copper material whereby device performance and yield is improved, improved planarity of the copper layer, improved electrical performance of integrated circuits, and/or improved selectivity of copper to oxide.

Figure 1:
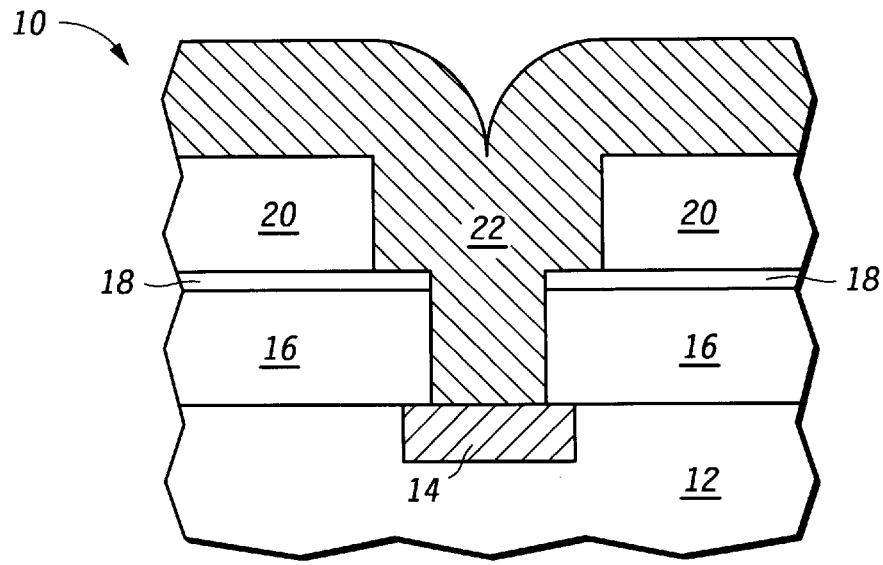
FIGS. 1–5 illustrate, in cross-sectional diagrams, a method for forming a copper interconnect over an integrated circuit (IC) using a chemical mechanical polishing (CMP) slurry in accordance with the present invention.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DESCRIPTION OF A PREFERRED EMBODIMENT

Generally, the present invention is a new slurry for use in the integrated circuit (IC) industry in order to form chemically mechanically polished (CMP) copper interconnects. In particular, the slurry taught herein contains an oxidizing agent (e.g., hydrogen peroxide $H_2O_2$), a citrate salt (e.g., ammonium citrate or potassium citrate), an abrasive slurry (e.g., alumna abrasive or silica abrasive), and a balance of a solvent such as deionized water or an alcohol. In addition, the compound 1, 2, 4-triazole or a triazole derivative such as benzotriazole can be included within the slurry to improve copper polishing planarity.

It has been experimentally shown that the use of this new copper slurry results in an improved removal rate of copper whereby the throughput through a CMP processing tool can be improved. Removal rates of greater than 5000 angstroms per minute have been observed. In addition, experimental results have shown reduced pitting and corrosion of the copper material whereby the speed of the integrated circuit is improved and the yield of the integrated circuit is also improved over prior art copper slurries. In addition, it has been shown that good planarity has been achieved when using the slurry taught herein. Good planarity results in enhanced cross-sectional area of the copper interconnects whereby electrical performance is improved by reducing interconnect resistance. In addition, the selectivity of copper to silicon dioxide when using this slurry is high allowing for polish stopping when performing copper dual inlaid or single inlaid processing. Further, the CMP slurry taught herein is much more environmentally sound than other slurries which are used in the integrated circuit (IC) industry.

The invention can be further understood with reference to FIG. 1–5.

FIGS. 1–5 illustrate a method for forming a copper interconnect for an integrated circuit (IC). FIG. 1 illustrates a semiconductor structure 10 which has a substrate 12. In FIG. 1, a substrate 12 has a base/bottom region which is typically a single crystalline silicon wafer. However, other semiconductor substrates can be used such as germanium, gallium arsenide, germanium silicon, silicon-on-insulator (SOI) substrates, silicon carbide substrates, epitaxial layers, polysilicon substrate, and the like.

Although not specifically illustrated in FIG. 1, conventional integrated circuit processing is used to form field isolation and active electrical devices (e.g., capacitors, MOSFETs, bipolar devices, diodes, logic gates, etc.) over the surface of the starting substrate material. These layers are inherently and collectively illustrated as the bottom/base layer 12 in FIG. 1. These active devices formed over the substrate are interconnected by semiconductive layers such as polysilicon, amorphous silicon, or salicided regions. In the alternative, these active circuits may also be interconnected by metallic interconnects or some combination of semiconductive interconnects and metallic interconnects. FIG. 1 illustrates a layer 14 which is representative of at least one of these semiconductive or metallic interconnect structures. If the layer 14 is chosen to be a metal interconnect, a material such as tungsten, aluminum, and aluminum alloy, copper, gold, silver, refractory metals, conductive oxides, composites thereof, or the like is typically chosen.

FIG. 1 illustrates that a dielectric layer 16 is formed over a top of the interconnect structure 14. In one form, the layer 16 of FIG. 1 is a furnace tetraethylorthosilicate (TEOS) layer and/or an ozone TEOS layer. In other forms, the layer 16 can be a low-k dielectric, borophoshosilicate glass (BPSG), fluorinated TEOS (FTEOS), polymer materials, plasma enhanced TEOS (PETEOS), composites thereof, and the like. A typical thickness for the layer 16 is somewhere between a range of roughly 2000Å to 8000Å and the dielectric layers are typically formed by some form of chemical vapor deposition (CVD).

An etch stop layer 18 is then formed over a top of the layer 16. Layer 18 is typically formed from a plasma enhanced nitride (PEN), a silicon oxynitride (SiON) material, composites thereof, like layers which have different etch rates than oxide when exposed to oxide etch species. A typical thickness for the layer 18 is between roughly 100Å and 300Å. In it important to note that time etching may be used whereby the need for any etch stop layer is the structure of FIG. 1 is not needed. Therefore, an etch stop layer 18 is optional.

After formation of the etch stop layer 18, a dielectric layer 20 is then formed over a top of the etch stop layer 18. The material composition of the layer 20 is similar to the layer 16 which was previously discussed. In addition, the thickness of the layer 20 is comparable to the thickness of layer 16 as previously discussed or is made with layer 16 is up to two times as thick as the layer 20. Known photolithographic processing and convention etch technology is then utilized to form a via opening through the layer 16 and a trench interconnect opening through the layer 20. These openings through the layers 16 and 20 can be formed in a via first manner or a trench first manner as is known in the dual inlaid art. Furthermore, although dual inlaid processing is shown in FIGS. 1–5, the polishing slurry and process taught herein may be used to form single inlaid structures or copper plug regions.

A conductive layer 22 is then deposited over a top surface of the layer 20, within the via opening in layer 16, and within the interconnect opening of layer 20. The formation of the layer 22 in FIG. 1 begins by forming a thin barrier layer. Typical barrier layers include tantalum nitride, titanium nitride, titanium tungsten, tantalum, titanium, tantalum silicon nitride, tungsten nitride, alloys of these materials, composites thereof, and the like. Typical thicknesses of the barrier layer run between roughly 20Å and a few hundred angstroms. The barrier layer is needed to ensure that copper within subsequent metallization regions is properly contained. Subsequent copper regions which contain copper atoms will not adversely contaminate surrounding silicon-containing regions (e.g., $SiO_2$) as long as an adequate barrier is formed.

After formation of the barrier layer, a chemical vapor deposition (CVD) process is then utilized to form a layer of copper over the barrier layer. This layer of copper is typically on the order of 1000–3000Å in thickness. This copper material is either a pure copper layer (i.e., a copper layer not intentionally doped with another atom or set of atoms) or a copper alloy (which is intentionally doped with another atom other than Cu). In addition, this CVD copper layer may also chemically interact with the previously deposited barrier layer to form at least an interface/bottom alloy material within the layer 22 illustrated in FIG. 1. The CVD copper layer may be replaced with an ionized metal plasma (IMP) layer of copper or an IMP layer of a copper alloy. Also, the formation of the seed layer may be performed using a collimated physical vapor deposition (PVD) process. Typically, the copper material which is deposited in FIG. 1 has a copper concentration of greater than 80%.

After formation of the IMP and/or CVD copper layer, an electroplating process is used to form additional copper material on top of the CVD or IMP copper base. Typically, copper electroplating is performed until an overall thickness of the layer 22 of roughly 7,000–15,000Å is achieved. The electroplated copper may either be pure copper or a copper composite material.

Figure 2:
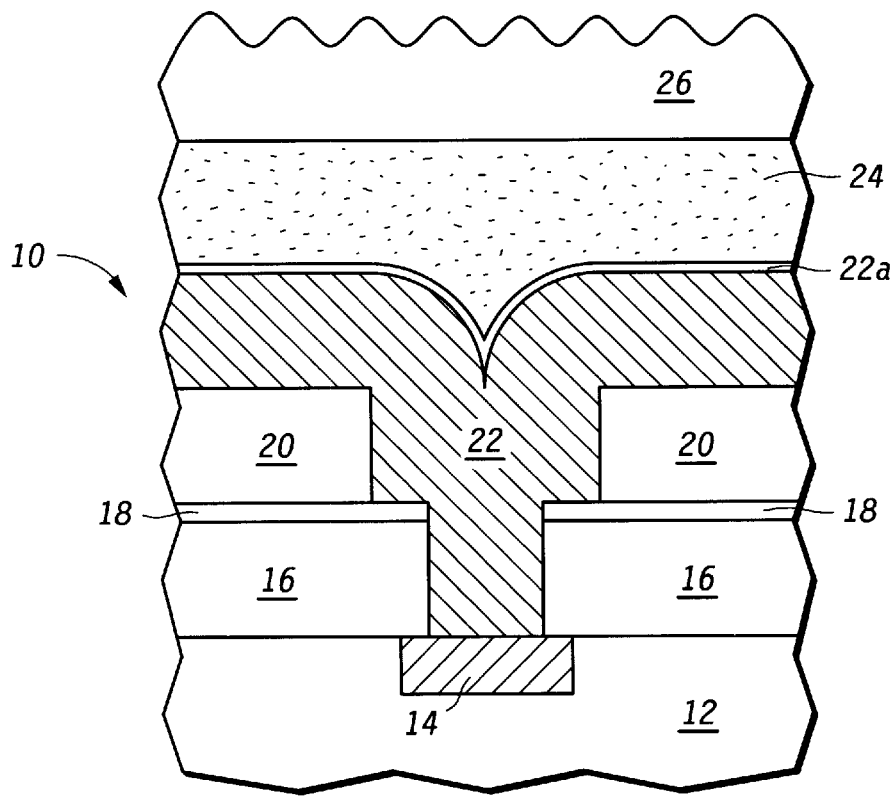

FIG. 2 illustrates that the structure 10 of FIG. 1 is placed into a chemical mechanical processing (CMP) tool. The copper layer 22 of FIG. 1 is placed into contact with a chemical mechanical polishing (CMP) slurry 24 as illustrated in FIG. 2. A chemical mechanical polishing pad 26 is placed in contact with the slurry 24 and is mechanically rotated and applied with pressure in order to result in effective chemical/mechanical removal of upper portions of the layer 22.

FIG. 2 illustrates an oxidized layer 22a which is formed from the layer 22. The layer 22a is an oxidized copper layer which is formed due to the exposure of the layer 22 to the slurry 24 in FIG. 2. In essence, the layer 24 contains an oxidizing species which oxidizes a thin top portion of the layer 22 to form the layer 22a as illustrated in FIG. 2. Other chemical species within the slurry 24 will chemically attack the layer 22a to dissolve layer 22a into the slurry 24. In addition, various particles or abrasive slurry materials within the slurry 24 along with the mechanical movement of the polishing pad 26 results in mechanical abrasion of the layer 22a to further effectuate removal of the layer 22a from the layer 22. Through progressive oxidation and removal of layer 22a and subsequent oxidized Cu layers, top surfaces of the layer 22a are removed to enable effective copper chemical mechanical polishing (CMP).

The slurry 24 illustrated in FIG. 2 contains an oxidizing agent, a carboxylate salt (e.g., a citrate salt), an abrasive slurry, a solvent, and an optional triazole or triazole derivative. Specifically, the oxidizing agent which can be utilized within the slurry is hydrogen peroxide ($H_2O_2$). Carboxylate salts which have been shown to be effective for removal of copper includes one of many citrate salts such as one or more of ammonium citrate or potassium citrate. A typical abrasive which has been experimentally shown to result in good copper removal and planarization is an alumina abrasive, but a silica abrasive in lieu of the alumina abrasive or in addition with the alumina abrasive may be used. In addition, an optional triazole derivative or triazole solution may be added to the slurry. It was experimentally found, for example, that the addition of 1, 2, 4-triazole to the copper CMP slurry has been shown to improve copper planarization by reducing the amount of copper recessing into oxide trench openings. Typical solvents used in the slurry 24 of FIG. 2 is one or more of deionized water ($H_2O$) or an alcohol.

In general, the oxidizing agent ($H_2O_2$) of the slurry 24 may be within any range of roughly 0.2 weight percent (wt %) to 5.0 weight percent (wt %). The carboxylate salt or citrate salt can be within a range of roughly 0.2 weight percent to roughly 20 weight percent. The abrasive slurry (alumna abrasive) is roughly 1.0 weight percent to 12.0 weight percent of the slurry 24. In addition, an optional triazole or triazole derivative can be provided within the slurry 24 to be roughly 0.05 weight percent to 2.0 weight percent of the slurry 24. A remaining balance of the slurry 24 is typically deionized water and/or an alcohol solution.

In a preferred form, it has been experimentally shown that adequate copper (Cu) polishing has been achieved using a hydrogen peroxide range between 1.0 weight and 1.5 weight percent, a citrate salt concentration within the range of 0.8 weight percent and 1.3 weight percent, an alumna abrasive concentration within the range of 2.0 weight percent and 4.0 weight percent, a triazole concentration between roughly 0.1 weight percent and 0.2 weight percent, and a remaining balance solvent. A preferred solution within this range which has been utilized is 1.2 weight percent hydrogen peroxide, 1.1 weight percent ammonium citrate, 3.0 weight percent alumina slurry, 0.12 weight percent, 1, 2, 4-triazole, and a remaining balance deionized water ($H_2O$).

Figure 3:
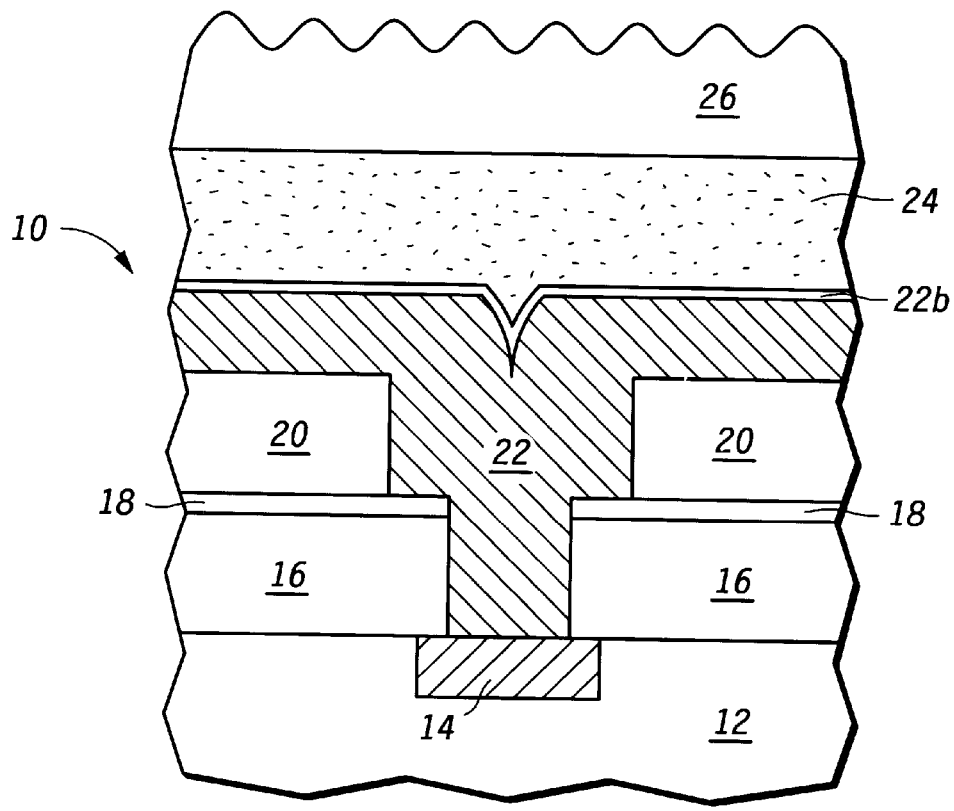

FIG. 3 illustrates that the previously illustrated layer 22a has been removed by the slurry 24 in conjunction with the mechanical motion of the polishing pad 26. Oxidized layers 22b are continually formed as polishing progresses and as oxidized material is being removed. These oxidized layers 22b, which continually form over time and new Cu atoms are exposed to the slurry, are continually removed by the chemical interaction of the slurry 24 in conjunction with the mechanical interaction of the polishing pad 26. Therefore, as illustrated in FIG. 3, an overall thickness of the layer 22 overlying the dielectric 20 is reduced in thickness while an overall planarity of the layer 22 is gradually improved over time.

Figure 4:
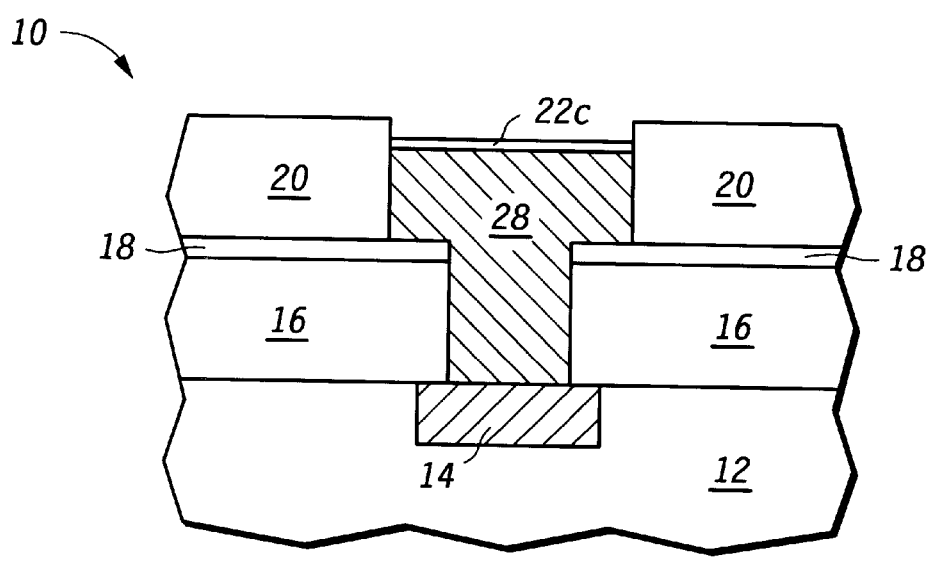

FIG. 4 illustrates that chemical mechanical polishing (CMP) using the slurry 24 continues until a copper interconnect 28 is formed as illustrated in FIG. 4. In a preferred form, the interconnect 28 would be formed co-planar with the top surface of the layer 20. However, some recessing/dishing of the copper layer 22 can occur in most CMP systems resulting in a recessed interconnect 28 as shown in FIG. 4. It is important to note that the presence of the triazole or triazole derivative in the CMP slurry has been experimentally shown to reduce this adverse recessing of the copper interconnect 28. However, total elimination of the recessing of the layer 28 may not be possible in all applications. FIG. 4 also illustrates that a thin copper oxide layer 22c may be left remaining on a top surface of the interconnect layer 28.

Figure 5:
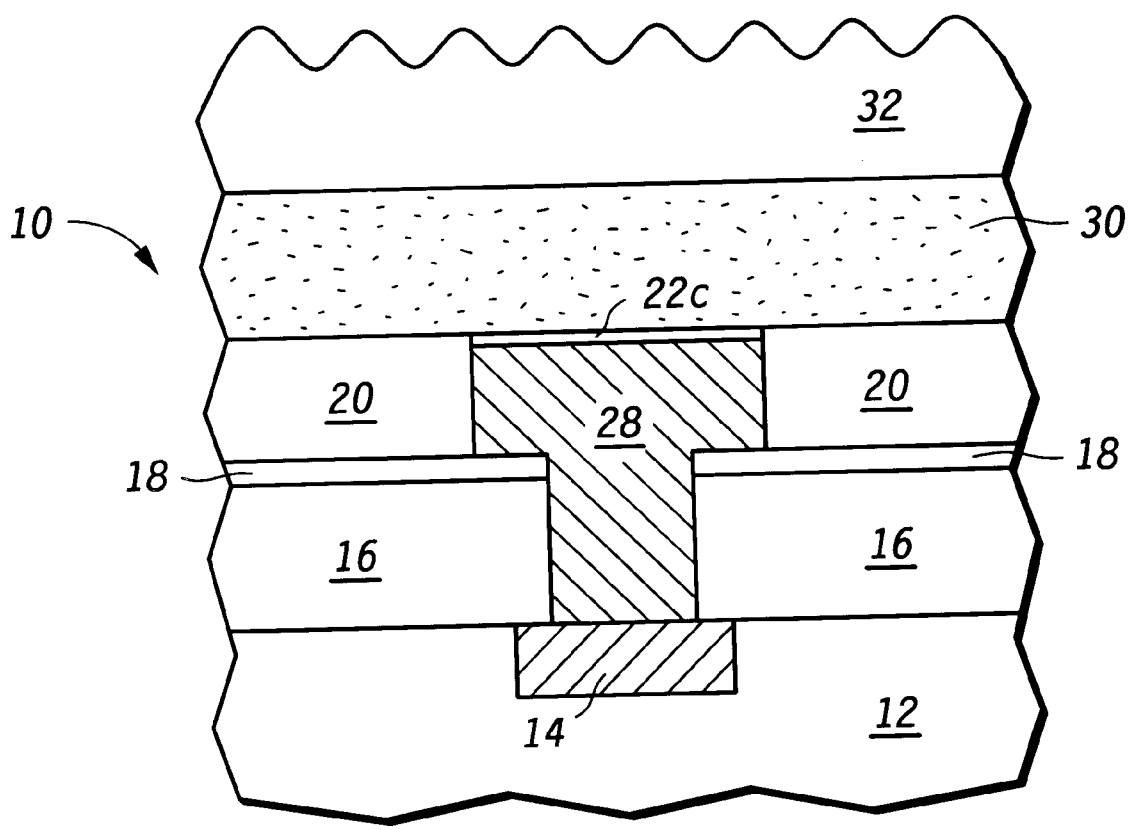

FIG. 5 illustrates that the copper recessing problem illustrated in FIG. 4 can be remedied by performing a subsequent oxide polish in addition to the copper polish illustrated in FIGS. 2–4. In order to perform the oxide polish, a second slurry 30 and a second polishing pad 32 are applied over the top of semiconductor structure 10 in order to perform a second CMP operation. While the polishing pad 32 of FIG. 5 and pad 26 of FIG. 3 may be the same pad on a same CMP tool, the pads 26 and 32 may be different polishing pads on very different CMP tools. The slurries 30 and 24 are preferably different whereby the slurry 30 is optimized for oxide removal selective to copper while the slurry 24 is optimized for copper removal selective to oxide. In FIG. 5, the slurry 30 is typically a silica abrasive which contains KOH and deionized water. This slurry 30 in conjunction with the polishing pad 32 will enable effective removal of a thin top portion of layer 20 whereby the layer 20 is once again made co-planar with the top surface of the copper interconnect 28.

In FIG. 5, a copper dual inlaid interconnect is completed by using the copper CMP slurry taught herein.

Although the invention has been described and illustrated with reference to specific embodiments, it is not intended that the invention be limited to those illustrative embodiments. Those skilled in the art will recognize that modifications and variations may be made without departing from the spirit and scope of the invention. For example, the thicknesses discussed herein will most likely shrink over time as lithographic feature sizes shrink and technological advancement progresses. Other deposition methods such as low pressure CVD (LPCVD), plasma enhanced CVD (PECVD), physical vapor deposition (PVD), electroless plating, sputtering, and the like may be used to form various layers herein. Other oxidation agents other than $H_2O_2$ may be used wherein the oxidation agent taught herein can be any chemical that oxidized copper. Therefore, it is intended that this invention encompass all of the variations and modifications as fall within the scope of the appended claims.

What is claimed is:

1. A chemical mechanical polishing slurry comprising:
   0.2 wt % to 5 wt % of an oxidizing agent;
   0.2 wt % to 20 wt % of a carboxylate salt;
   1.0 wt % to 12 wt % of an abrasive slurry; and a solvent.

2. The chemical mechanical polishing slurry of claim 1 wherein the solvent is deionized water.

3. The chemical mechanical polishing slurry of claim 1 wherein the solvent is an alcohol.

4. The chemical mechanical polishing slurry of claim 1 wherein the carboxylate salt is a citrate salt.

5. The chemical mechanical polishing slurry of claim 4 wherein citrate salt is ammonium citrate.

6. The chemical mechanical polishing slurry of claim 4 wherein citrate salt is potassium citrate.

7. The chemical mechanical polishing slurry of claim 1 wherein 1,2,4-triazole is added to the chemical mechanical polishing slurry.

8. The chemical mechanical polishing slurry of claim 7 wherein the 1,2,4-triazole is added to the chemical mechanical polishing slurry within a weight percentage range of 0.05 wt % to 2.0 wt %.

9. The chemical mechanical polishing slurry of claim 1 wherein a triazole derivative is added to the chemical mechanical polishing slurry.

10. The chemical mechanical polishing slurry of claim 9 wherein the triazole derivative is added to the chemical mechanical polishing slurry within a weight percentage range of 0.05 wt % to 2.0 wt %.

11. The chemical mechanical polishing slurry of claim 1 wherein the oxidizing agent is hydrogen peroxide ($H_2O_2$).

12. The chemical mechanical polishing slurry of claim 1 wherein the abrasive slurry is alumina abrasive.

13. The chemical mechanical polishing slurry of claim 1 comprising:
   1.0 wt % to 1.5 wt % of an oxidizing agent;
   0.8 wt % to 1.3 wt % of a carboxylate salt; and
   2.0 wt % to 4.0 wt % abrasive slurry.

14. The chemical mechanical polishing slurry of claim 1 comprising:

1.2 wt % of an oxidizing agent;

1.1 wt % of a carboxylate salt which is a citrate salt; and 3.0 wt % abrasive slurry.

15. The chemical mechanical polishing slurry of claim 1 wherein the oxidizing agent is hydrogen peroxide, the carboxylate salt is ammonium citrate, and the abrasive slurry is an alumina abrasive.

16. The chemical mechanical polishing slurry of claim 15 wherein a triazole derivative is added to the chemical mechanical polishing slurry.

17. A method for polishing a cooper layer on an integrated circuit, the method comprising the steps of:

forming a dielectric layer having a top surface;

forming an opening in the dielectric layer;

forming a layer comprising copper within the opening and over the top surface of the dielectric layer; and polishing the layer comprising copper with a polishing slurry comprising an oxidizing agent, a citrate salt, an abrasive slurry, and a solvent, wherein a portion of the layer comprising copper overlying the top surface of the dielectric layer is removed and a portion of the layer comprising copper remains and a opening.

18. The method of claim 17 wherein the step of forming the layer comprising copper comprises:

forming the layer comprising copper with at least an 80% concentration of copper atoms.

19. The method of claim 17 wherein the step of forming the layer comprising copper comprises:

forming the layer comprising copper via an electroplating process.

20. The method of claim 17 further comprising:

performing an oxide polish process after the step of polishing the layer comprising copper.

21. The method of claim 17 further comprising:

adding a triazole derivative to the polishing slurry.

22. The method of claim 17 further comprising:

adding 1,2,4-triazole to the polishing slurry.

23. The method of claim 17 wherein the polishing slurry comprises:

1.0 wt % to 1.5 wt % of the oxidizing agent;

0.8 wt % to 1.3 wt % of the citrate salt; and 2.0 wt % to 4.0 wt % of the abrasive slurry.

24. The method of claim 17 wherein the polishing slurry comprises:

1.2 wt % of the oxidizing agent;

1.1 wt % of the citrate salt which is a citrate salt; and 3.0 wt % of the abrasive slurry.

25. The method of claim 17 wherein citrate salt is ammonium citrate.

26. The method of claim 17 wherein citrate salt is potassium citrate.

27. The method of claim 17 wherein the oxidizing agent is hydrogen peroxide.

28. The method of claim 17 wherein the oxidizing agent is hydrogen peroxide, the citrate salt is ammonium citrate, and the abrasive slurry is an aluminum abrasive.

29. The method of claim 28 wherein a triazole derivative is added to the polishing slurry.

30. The method for polishing a copper layer on an integrated circuit, the method comprising the steps of:

forming a first dielectric layer;

forming an etch stop layer over the first dielectric layer;

forming a second dielectric layer over the etch stop layer wherein the second dielectric layer has a top surface;

forming a via through the first dielectric layer;

forming an interconnect trench through the second dielectric layer wherein the via underlies the interconnect trench;

forming a barrier layer within the interconnect trench and the via;

forming a layer comprising copper within the interconnect trench, within the via, over the top surface of the second dielectric layer, and over the barrier layer; and polishing the layer comprising copper with a slurry comprising an oxidizing agent, a citrate salt, an abrasive slurry, a triazole derivative, and a solvent, a portion of the layer comprising copper remains in the via and the interconnect trench while a portion of the layer comprising copper overlying the top surface of the second dielectric layer is removed.

31. The method of claim 30 wherein the slurry comprises:

1.0 wt % to 1.5 wt % of the oxidizing agent;

0.8 wt % to 1.3 wt % of the citrate salt;

2.0 wt % to 4.0 wt % of the abrasive slurry; and 0.5% to 2.0% of the triazole derivative.

32. The method of claim 30 wherein the oxidizing agent is hydrogen peroxide, the citrate salt is ammonium citrate, the abrasive slurry is an alumina abrasive, and the triazole derivative is 1,2,4-triazole.

\* \* \* \* \*

UNITED STATES PATENT AND TRADEMARK OFFICE
CERTIFICATE OF CORRECTION

PATENT NO. : 5,897,375
DATED : April 27, 1999
INVENTOR(S) : David Watts, et al.

It is certified that error appears in the above-identified patent and that said Letters Patent is hereby corrected as shown below:

Claim 17, column 7, line 14, replace "cooper" with --copper--.

Signed and Sealed this

Seventh Day of December, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,897,375

DATED : April 27, 1999

INVENTOR(S) : David K. Watts, et al.

It is certified that error(s) appear in the above-identified patent and that said Letters Patent is hereby corrected as shown below:

Claim 17, column 7, line 26 replace "and a opening" with --in the opening--.

Signed and Sealed this

Twenty-seventh Day of June, 2000

Attest:

Q. TODD DICKINSON

*Attesting Officer*   *Director of Patents and Trademarks*